May 10, 1938.  C. L. PECK  2,116,845
APPARATUS FOR CUTTING SEMISOLIDS
Filed Jan. 29, 1936  2 Sheets-Sheet 2
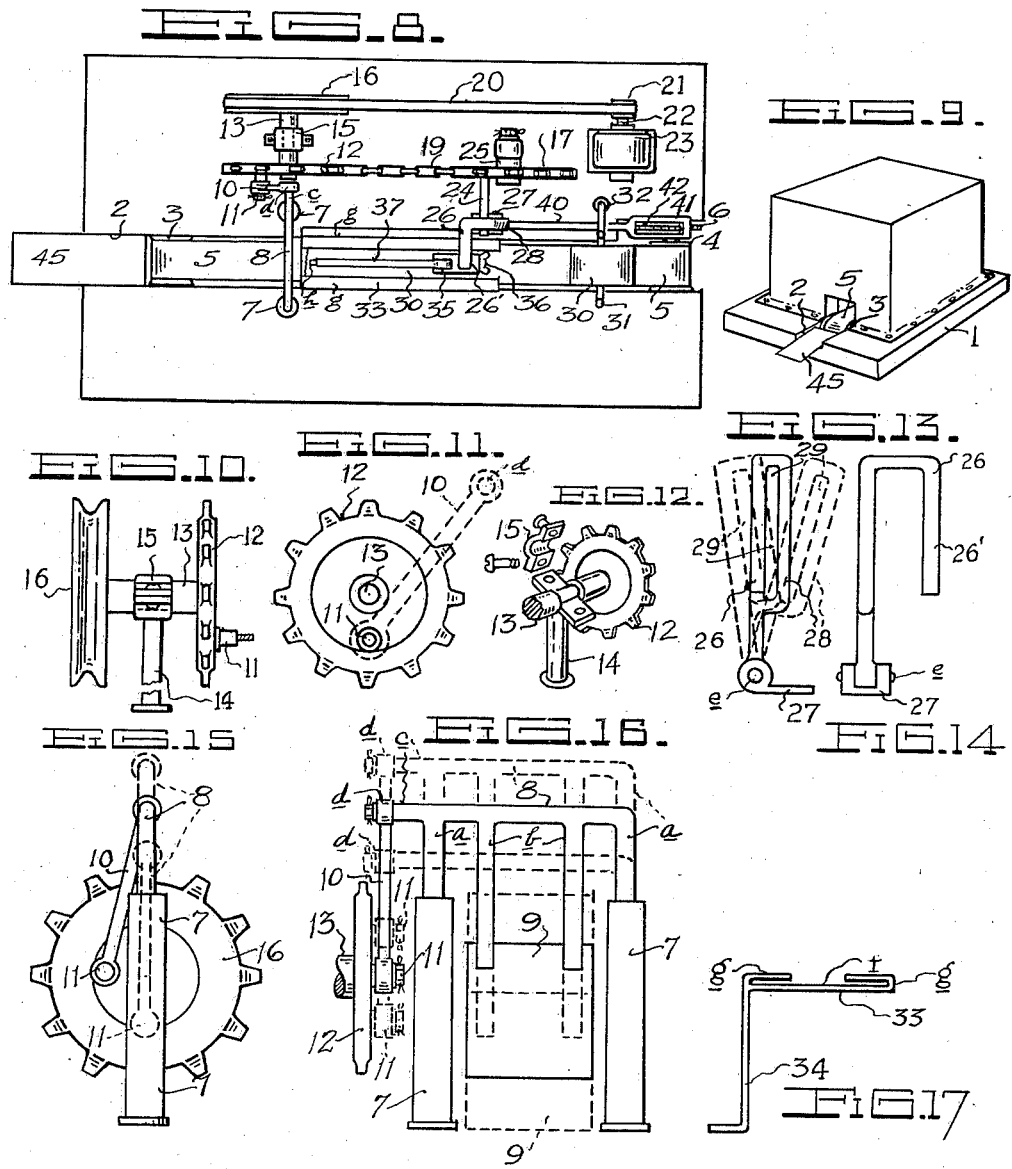
Creasey L. Peck
Inventor
By Cecil L. Wood
Attorney Patented May 10, 1938

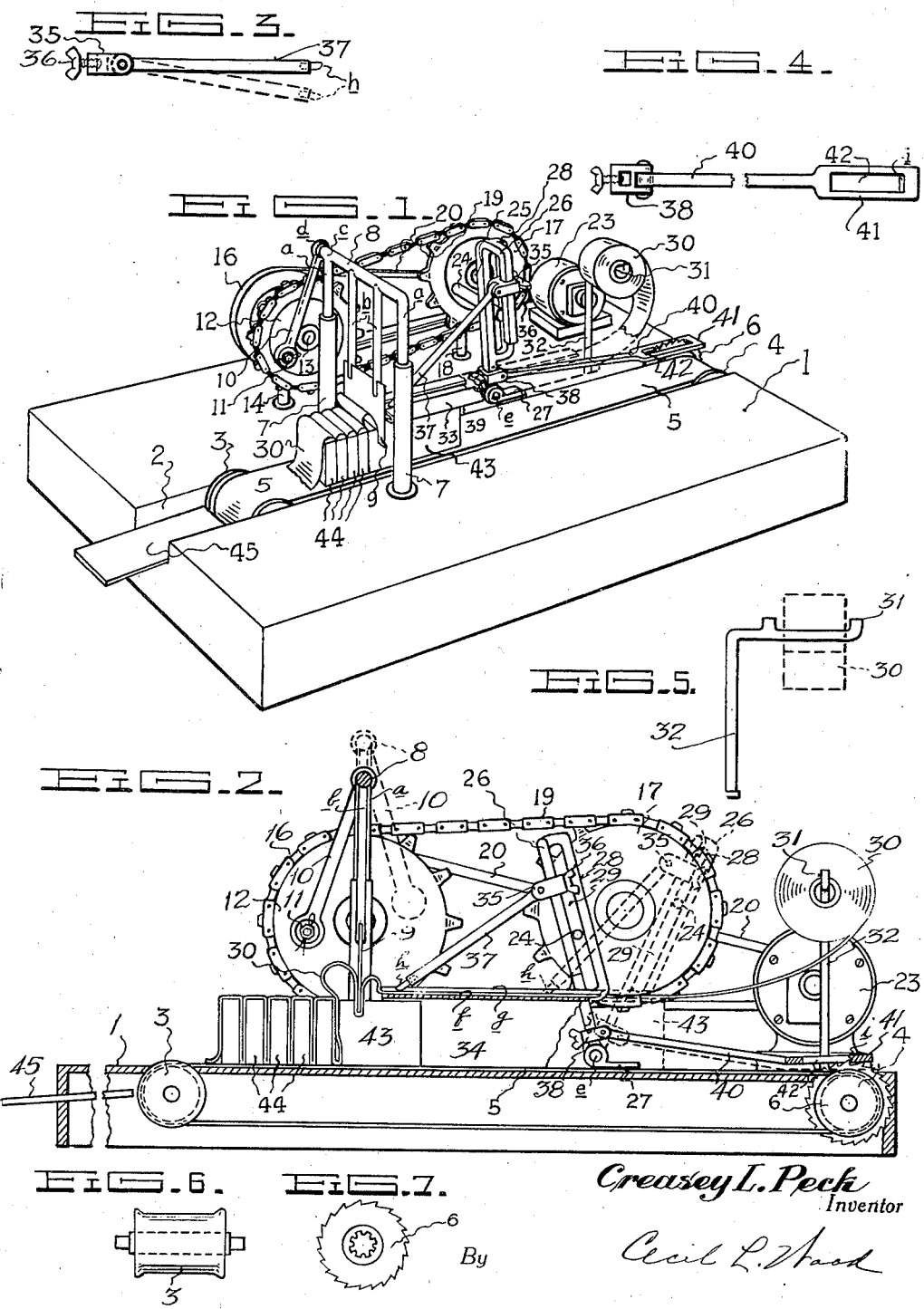

2,116,845

UNITED STATES PATENT OFFICE 2,116,845

APPARATUS FOR CUTTING SEMISOLIDS

Creasey L. Peck, Fort Worth, Tex.

Application January 29, 1936, Serial No. 61,362

6 Claims. (Cl. 31—20)

This invention relates to cutting and wrapping apparatus and has particular reference to a device for cutting butter into individual portions or small blocks for restaurants, hotels, or other places where food is served to the public, and its principal object resides in the provision of a combination of elements cooperating to afford a means of cutting or slicing the material, as aforesaid, and separating the portions by oiled paper, or other suitable material, before packing the commodity in convenient-sized cartons or packages for delivery to the trade.

Another object of the invention resides in the provision of a machine which is capable of handling the butter, or other dairy products, or the like, in a sanitary and hygienic fashion, rendering the accomplishment of such operations by hand unnecessary and, since the device is entirely automatic, the product need not be touched by human hands and thus become contaminated, or otherwise come in contact with impurities which might tend to impair the general health and welfare of the public.

Still another object of the invention is manifest in the provision of a device of the character described wherein are provided certain novel and salient features of construction which afford both efficient and economical operation, providing the trade with a prepared product suitable for serving the patronage without the necessity of maintaining machines, or other special equipment, for preparing the commodity for use, and thereby serving to facilitate and expedite the service of patrons in prepared-food dispensaries.

Broadly, the invention seeks to comprehend the provision of an automatic cutting machine for slicing butter and preparing the same for the market to avoid the necessity of hand-cutting and packing, separating each slice or block with an insulating material, such as oiled paper, Cellophane, or the like, as the same is severed from the bulk, thus providing a means of preparing such products in greater volume at a minimum of effort and expense yet affording the public a more uniform and higher quality product.

While the foregoing objects are paramount, other and lesser objects will become manifest as the description proceeds taken in connection with the appended drawings wherein:

Figure 1 is a perspective view of the invention having the hood removed and showing the same in operation.

Figure 2 is a side elevational view of the invention illustrating, in dotted lines, the relative portions of certain operative parts and especially showing operation of the paper feeder and the manner in which the paper is manipulated by the knife.

Figure 3 is a side elevational view of the paper feeder, showing the adjustment screw.

Figure 4 is a side view of the conveyor actuating arm and illustrating the adjustment screw.

Figure 5 is a detailed illustration of the paper roll supporting spindle.

Figure 6 is a side elevational view of one of the conveyor spools.

Figure 7 is a side elevational view of the ratchet wheel for actuating the belt conveyor.

Figure 8 is a plan view illustrating the driving medium.

Figure 9 is a perspective view of the invention showing a form of hood or covering therefor.

Figure 10 is an elevational view of the standard and bearing for the driving pulley and knife actuating sprocket.

Figure 11 is a side elevational view of the knife actuating sprocket showing the pitman in dotted lines.

Figure 12 is a perspective view of the sprocket and drive assembly.

Figure 13 is a side elevational view of the paper feeder assembly and illustrating, in dotted lines, the oscillating movement of the same.

Figure 14 is a front elevational view of Figure 13.

Figure 15 is a side elevational view of the knife actuating mechanism.

Figure 16 is a front elevational view of Figure 15, and

Figure 17 is a detailed end view of the paper guide.

Accordingly, therefore, the purpose of the invention is best served by providing a base 1 upon which the operative assembly is mounted, as illustrated in Figures 1 and 2, and a longitudinal cut or slot 2 is arranged within the base 1 having rollers 3 and 4 mounted for rotation in each end of the slot 2 around which is arranged a conveyor belt 5 whose uppermost surface operates on the same horizontal plane as the base 1 on each side of the slot 2. The roller 4 is provided on one end with a ratchet wheel 6 which is rigidly fixed to the roller 4 so that the latter can be rotated by the ratchet wheel 6 which in turn operates the conveyor belt 5 and whose function will be presently described.

Forwardly of the base 1 and situated on each side of the conveyor belt 5 are arranged a pair of tubular standards 7 which slidably receive the lowermost ends of the downwardly extending legs $a$ of a substantially inverted U-shaped yoke member 8 having a pair of integral bars $b$ extending downwardly intermediate the legs $a$ and to whose lowermost ends is rigidly fixed a blade 9, as illustrated in Figures 1 and 2, and which is capable of vertical oscillation, as will be more completely described presently.

An integral projection $c$ is provided on one end of the horizontal portion or top bar of the yoke member 8 which affords a pivot $d$ for the uppermost end of a pitman 10 whose lowermost end is pivoted to an eccentric pin 11 integral with or rigidly attached to a sprocket 12 which is mounted on a stub shaft 13 supported by a standard 14, having a bearing 15 to receive the shaft 13 and a grooved pulley 16 is mounted on the opposite end of the shaft 13, as shown in detail in Figure 10.

A second sprocket 17 is mounted on a standard 18 a predetermined distance rearwardly of the sprocket 12, before mentioned, and upon the base 1 on a parallel line with the conveyor belt 5, as shown in Figures 1 and 8, and a sprocket chain 19 surrounds both sprockets 12 and 17 so as to transmit power from the sprocket 12 to the sprocket 17 as the grooved pulley 16 is rotated by a belt 20 which surrounds the pulley 16 and a small pulley 21 on the shaft 22 of a motor 23 positioned near the rearmost end of the base 1, as shown in Figures 1, 2 and 8. The sprocket 17 is also provided with an eccentric pin 24 somewhat longer than the eccentric pin 11 on the sprocket 12, and whose function is to operate the paper feeding mechanism whose function will become manifest.

The cooperative functions of the device depend upon the proper coordination of the various operating elements employed in producing the desired result. It is therefore necessary to cause the conveyor 5 to function in exact coordination with the knife or blade 9 which severs the product and separates the severed portions by layers of paper which is fed toward the knife 9 in suitable quantities as required. For this reason the eccentric pins 11 and 24 on the sprockets 12 and 17 are so positioned as to assume the same axial relationship to the shaft 13 on the sprocket 12 and the spindle 25 bearing the sprocket 17.

The paper feeding assembly consists of a member 26 which is in the form of an inverted U having its supporting leg longer than the opposite vertical portion and pivoted at $e$ to a hinge 27 which is secured to the base 1 near the conveyor belt 5. On the rearmost side of the member 26 is a laterally extending integral portion 28 having a slot 29 vertically arranged therein and receiving the free end of the eccentric pin 24 on the sprocket 17. Thus, when the sprocket 17 is rotated the pin 24, by reason of its projecting through the slot 29, will oscillate the member 26, the pin 24 moving longitudinally in both directions in the slot 29, in the manner shown in Figure 13, which also shows the construction of the member 26 and its appurtenances.

A roll of paper 30, or other suitable material, which is ribbon-like in form, is maintained for free rotation on a spindle 31 which is supported by a standard 32 rising from the base 1, as shown in Figures 1, 2 and 3, and moves toward the knife 9 through a guide 33 which is shown in detail in Figure 16. The guide 33 is so constructed so as to afford a solid surface $f$ over which the material travels while its edges are retained within the over-turned edges $g$ of the guide 33 which is supported by an integral vertical portion 34.

The shorter leg 26' of the member 26 of the paper feeder assembly adjustably receives a clamp 35 having a set-screw 36 therein and to which is pivoted a finger 37 in such a manner to permit its free end to loosely engage the surface of the paper 30 between the over-turned edges $g$ of the guide 33 when the member 26 moves rearwardly and slides freely thereover and when the member 26 moves forwardly the finger 37 bears firmly against the paper 30 and by friction urges the latter toward knife 9, as shown in Figure 2. The finger 37, illustrated in detail in Figure 3, is provided with a tip $h$ at its lowermost end to provide greater friction by which to move the paper along the surface $f$ of the guide 33 when the finger 37 is urged forwardly of the machine by the action of the sprocket 17, previously described.

Adjustably attached to and near the bottom of the member 26, and above the pivot $e$ of the latter, is a clamp 38 having a set-screw 39 therein and to which is pivotally attached an arm 40 whose free end is provided with an integral enlarged portion 41 which has a slot 42. The outer end of the slot 42 is beveled downwardly at $i$, as shown in detail in Figure 6. The slot 42 of the member 40 receives the uppermost segment of the ratchet wheel 6, as shown in Figures 1, 2 and 8, and the beveled portion $i$ is adapted to engage the backwardly extended teeth of the ratchet 6 and partially rotates toward the front of the machine as the member 26 is oscillated in that direction.

When the member 26 is urged rearwardly to its furthermost point, as shown in dotted lines in Figure 2, the member 40 is also urged backwardly and the beveled portion $i$ of the slot 42 is caused to engage another segment of the sprocket 6 to again rotate the latter a short distance forward. Thus, the conveyor belt 5 is moved only a short distance at a time forwardly of the machine coordinately with the upward movement of the blade 9 and the paper 30 is moved forwardly a predetermined length simultaneously with the forward movement with the conveyor belt 5 and the upward movement of the blade 9.

In operation, therefore, the commodity processed by the invention being of the conventional form of approximate rectangular quarter-pound bars 43, is projected upon the rearmost end of the belt 5 by means of a chute, or other suitable apparatus (not shown), and is moved forwardly toward the knife 9 in short movements occasioned by the operating of the arm 40 by the member 26 which is actuated, as previously mentioned, by the sprocket 17. As the bar of material 43 advances toward the blade 9, the paper strip 30 is accordingly advanced a distance of little more than twice the thickness of the material 43 beneath the knife 9 so that, when the latter is urged downwardly through the material 43 to sever the same, the paper is pressed through the material 43 by each operation of the knife 9, as shown in Figures 1 and 2, and thus affords a separating medium between each of the severed rectangular blocks 44 of the material 43.

The object in advancing the material 43 a predetermined distance forwardly of the machine is obviously to cause the blade 9 to contact and sever the latter into uniform portions 44 and in order to accomplish this it is necessary to effect the strict coordination of all of the operative elements hereinbefore referred to. For example, the finger 37 which moves the paper 30 must conform to the operation of the blade 9 and completely cooperate therewith. The adjustments 35 and 38 provide means to afford a variation in the stroke or action of the finger 37 and the arm 40 which latter actuates the conveyor belt 5. Therefore, the thickness of the severed portions of 44 can be governed by the extent of the movement of the finger 37 and the arm 40 whose function is controlled through the medium of the adjustments 35 and 38 previously mentioned.

After the material 43 is passed under the blade 9 and is severed into small rectangular portions 44, and the paper 30 is deposited thereinbetween, the entire block of the material 43 is passed from the conveyor 5 to a chute 45, or the like, from whence it can be carried by conveyor, or other apparatus (not shown), to be placed in convenient cartons or packages for delivery to the trade.

Although the invention has been described with great particularity, it is obvious that certain changes and modifications may be resorted to from time to time by those skilled in the art and such changes and modifications as may be considered within the spirit and intent of the invention may also be considered as coming within the scope of the appended claims.

What is claimed is:

1. In a butter slicing machine, a base traversed by a conveyor belt operating over rollers maintained in the said base, a ratchet wheel rigidly secured to one of the said rollers, a vertically operated blade disposed above one end of the said base and the said belt, a paper guide disposed longitudinally above said belt having a ribbon of paper movably extending therethrough, an oscillating member having a finger adjustably secured thereto, the said finger resting, at its free end, upon said paper, an arm adjustably secured to the lowermost end of the said oscillating member and extending rearwardly thereof and engaging said ratchet wheel, and means to actuate the said blade, the said oscillating member urging the paper toward the said blade.

2. A butter slicing machine comprising a base having a belt conveyor longitudinally traversing the said base, a vertically operated yoke member supporting a blade disposed above the said belt, a substantially inverted U-shaped oscillating member supported by the said base rearwardly of the said yoke member, a paper guide arranged above and longitudinally with the said belt, paper movably disposed in the said guide, adjustable means operated by the said oscillating member to move the said paper toward the said blade, and means adjustably secured to the lowermost end of the oscillating member to rotate the said ratchet wheel and move said belt and means to operate the said blade and the said oscillating member.

3. A butter slicing and wrapping machine comprising a base having a conveyor belt longitudinally traversing same, means on one end of the said base for driving the said belt forwardly of the said base, a blade supported for vertical operation by standards rising from the said base arranged on each of the said belts, a paper guide longitudinally arranged above the said belt and having a strip of paper extending therethrough, adjustable means contacting said paper and supported by an oscillating member urging the said paper toward the said blade, adjustable means secured to the said oscillating member rotating the said ratchet wheel, and means to operate the said blade and the said oscillating member.

4. In a machine of the character described, a base having a conveyor belt extending longitudinally therethrough, a ratchet wheel driving the said belt, a vertically disposed blade operatively arranged above the said belt, a paper guide extending along and above the said belt receiving a strip of paper, means adjustably supported by an oscillating member contacting the said paper rearwardly of the said blade and urging the said paper toward the said blade, and means adjustably carried by the said oscillating member to rotate the said ratchet wheel and means supported by the said base actuating the said blade and the said oscillating member.

5. A machine for cutting butter into individual blocks and separating the said blocks with paper comprising a base having a belt conveyor arranged thereacross, means maintained in the said base to move the said belt, cutting means operatively disposed above the said belt, paper movably arranged, within a guide above the said belt, an oscillating member operatively supported by the said base moving the said paper toward the said cutting means, and means carried by the said oscillating member rotating the said ratchet wheel and moving the said belt, and means operating the said cutting means and the said oscillating member.

6. Apparatus for cutting semi-solid materials into portions of predetermined dimension, comprising a base having a conveyor arranged thereon, cutting means operatively arranged above the said conveyor, a ribbon of paper operating through a guide above the said conveyor, means cooperating with the said cutting means and the said conveyor to urge the said paper toward the said cutting means, and means operating the said conveyor, cutting means and the said paper urging means.

CREASEY L. PECK.